Aug. 16, 1955   V. L. ROTHSTEIN ET AL   2,715,700
ADJUSTABLE MOUNT FOR ELECTRIC METERS
Filed Jan. 8, 1952
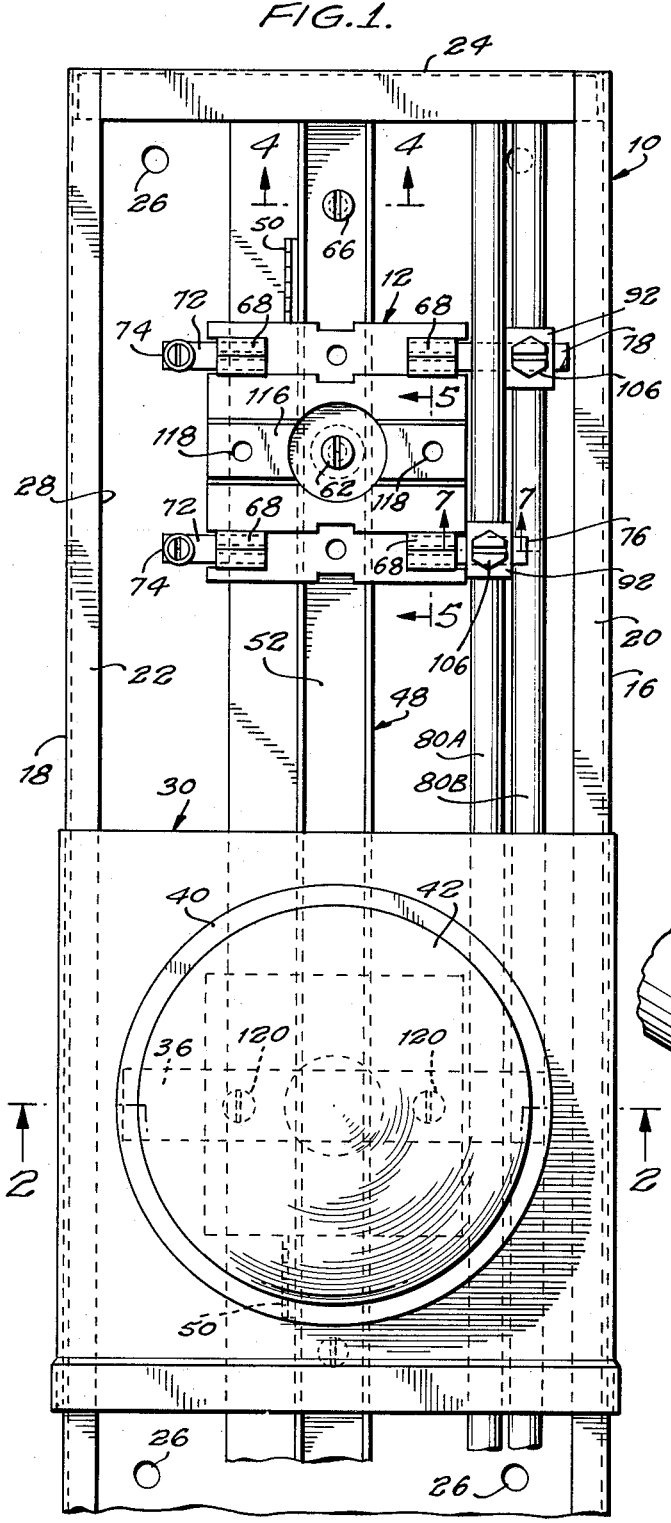
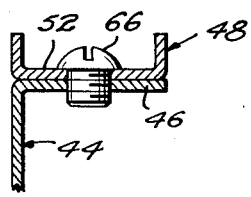
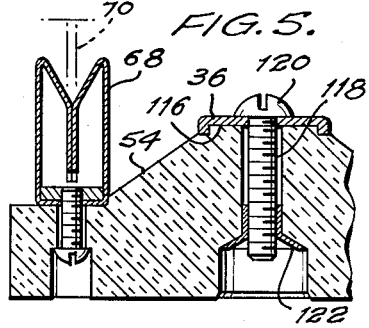
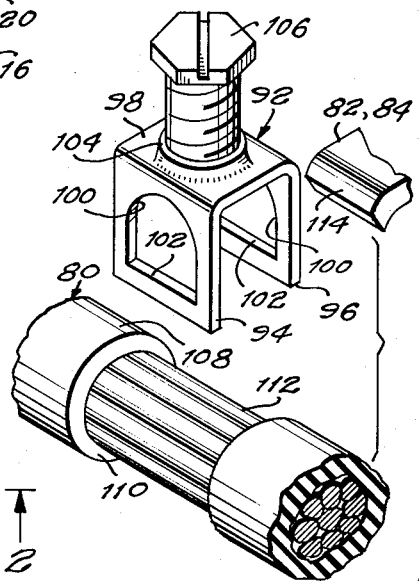
INVENTORS
VICTOR L. ROTHSTEIN,
EUGENE KRON Aug. 16, 1955 V. L. ROTHSTEIN ET AL 2,715,700
ADJUSTABLE MOUNT FOR ELECTRIC METERS
Filed Jan. 8, 1952 2 Sheets-Sheet 2
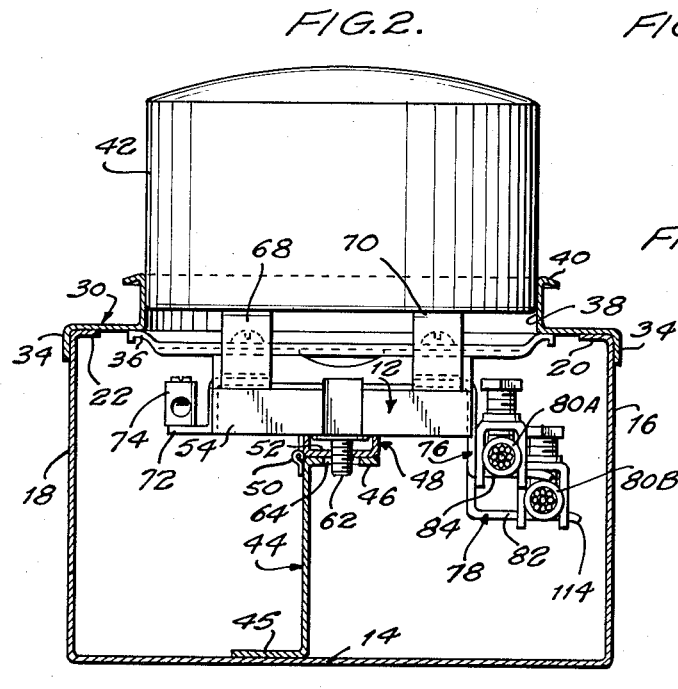
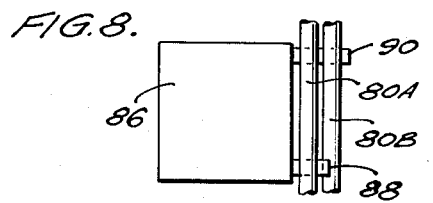
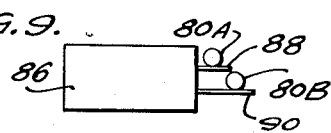
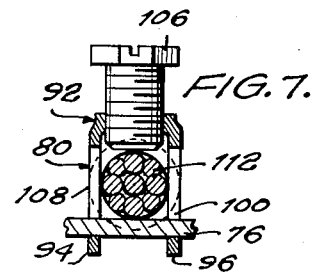
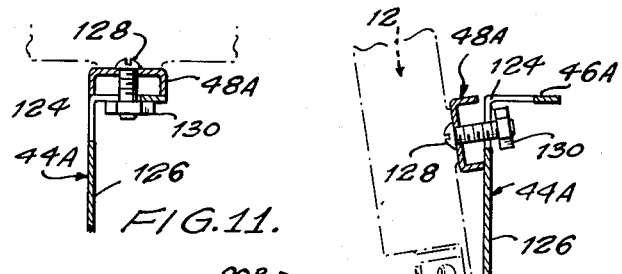
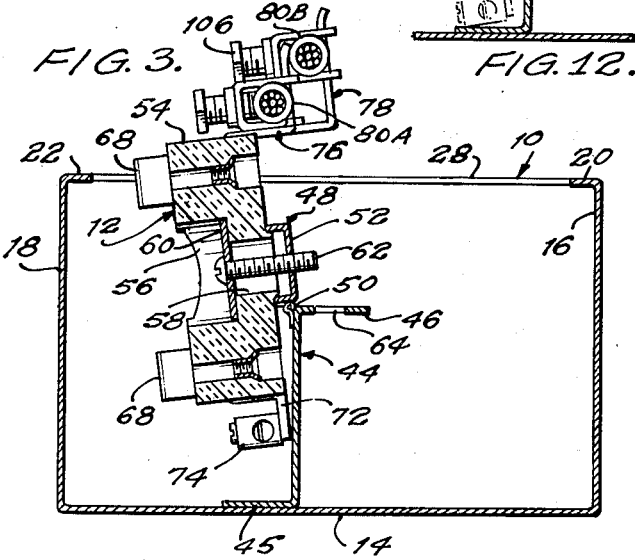
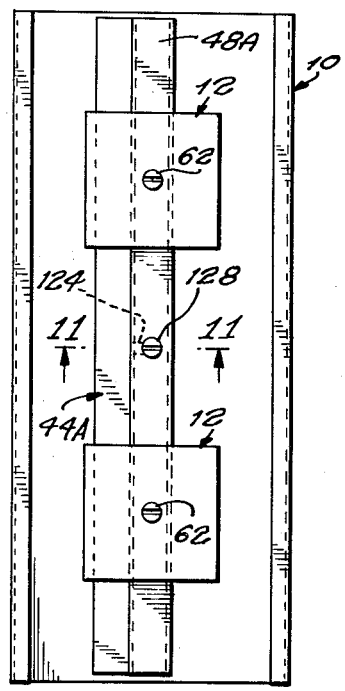
INVENTORS
VICTOR L. ROTHSTEIN,
EUGENE KRON
BY Edwin Levinsohn +
Harry Cole
ATTORNEYS United States Patent Office 2,715,700
Patented Aug. 16, 1955

2,715,700
ADJUSTABLE MOUNT FOR ELECTRIC METERS

Victor L. Rothstein, Long Island City, and Eugene Kron, Floral Park, N. Y., assignors to Federal Electric Products Company, Essex County, N. J., a corporation of Delaware Application January 8, 1952, Serial No. 265,508

7 Claims. (Cl. 317—109)

This invention relates to improved mounting means for electrical devices, and especially to adjustable mounts for electric meters.

Electric meters are often mounted on meter sockets provided in enclosed troughs. The spacing between the line terminals of the socket and the adjacent surfaces of the trough is usually such as to hinder or impede the electrician in connecting the electric service cables to the meter sockets.

Therefore, one object of the present invention is to provide an improved mounting means for an electric device, such as an electric meter, whereby the mounting will be readily adjustable so as to carry the electric terminals thereof from a normally inaccessible position to a readily accessible position to facilitate the wiring of said device.

Another object is to provide an improved swingably movable socket mounting for an electric meter.

A further object is to provide a novel wiring arrangement or layout to generally facilitate the wiring of electrical devices.

The above and other objects, features and advantages of the present invention will be more fully understood from the following description considered in connection with the accompanying illustrative drawings.

In the drawings:

Fig. 1 is a front elevation of an electric meter socket trough pursuant to the present invention, an electric meter being shown mounted in one of the sockets;

Fig. 2 is a sectional view taken on the line 2—2 of Fig. 1;

Fig. 3 is a view similar to Fig. 2, the electric meter being removed and the meter socket being shown in the adjusted position thereof;

Fig. 4 is a sectional view, on an enlarged scale, taken on the line 4—4 of Fig. 1;

Fig. 5 is a sectional view, on an enlarged scale, taken on the line 5—5 of Fig. 1;

Fig. 6 is an exploded view, on an enlarged scale, illustrating the solderless connection of the present invention;

Fig. 7 is a sectional view, on an enlarged scale, taken on the line 7—7 of Fig. 1;

Figs. 8 and 9 are diagrammatic illustrations of a wiring arrangement pursuant to the present invention;

Fig. 10 is a view similar to Fig. 1, on a smaller scale, and illustrates another embodiment of the present invention;

Fig. 11 is a fragmentary sectional view taken on the line 11—11 of Fig. 10; and

Fig. 12 is a view similar to Fig. 11, illustrating the adjusted position of the meter socket.

Referring now to Figs. 1 through 7 in detail, there is illustrated the presently preferred embodiment of the invention. Pursuant to said embodiment, provision is made for a meter socket trough 10 preferably formed of sheet metal and adapted to mount a desired plurality of electric meter sockets or mounts 12. The trough 10 is preferably constituted by the bottom wall 14 and the integral side walls 16 and 18 which are provided with the confronting flange portions 20 and 22, respectively. It will be understood that the trough is preferably closed at the ends thereof, one of the end walls being indicated at 24 at the upper end of the trough. While the trough is here illustrated as being vertically mounted on a suitable supporting surface, it will be understood that the trough may, if desired, be mounted horizontally thereon. In this connection it will be understood that suitable apertures or customary knock-outs may be provided, as indicated at 26 to facilitate the mounting of the trough.

The front opening 28 of the trough is closed by a plurality of meter plates 30, one of which is illustrated in position in Fig. 1. It will be understood that there is one meter plate for each electric meter 42, each meter plate abutting the adjacent meter plate to completely close the front opening of the trough. The meter plate 30 is mounted on the side wall flanges 20 and 22 and it itself provided with depending flanges, 34—34, which engage the side walls of the trough, as illustrated in Fig. 2. The meter plate is provided with a cross brace 36 which is suitably secured to the meter socket 12, as hereinafter described, for retaining the meter plate in fixed position on the trough. The meter plate is also provided with a central opening 38, surrounded by an upstanding collar 40, in which the electric meter 42 is received.

Pursuant to the present invention, the trough is provided with a substantially centrally disposed barrier or support member 44 which is suitably secured, as at 45, on the inner surface of the rear wall 14 and which extends longitudinally of the trough substantially midway between the side walls 16 and 18 thereof. Said support 44 is preferably formed of suitable metal and is provided at the upper end thereof with the laterally offset portion or flange 46 which is substantially parallel to the rear wall 14. A socket-mounting carrier, here shown as a metallic channel member 48, extends longitudinally of the trough, being hinged to the support 44 by the hinges 50. It will be understood that the hinges 50 are suitably spaced along the channel 48 and the support 44 to provide for the swinging or pivoting of the channel 48 on the support 44. It will be understood that the flange 46 of the support 44 constitutes a stop and retains the channel 48 in the normally operative position thereof, it being noted that the base portion 52 of the channel abuts the flange 46 in this position thereof, as illustrated in Fig. 2. Fig. 3 illustrates the relative disposition of the channel and the support when the channel has been swung on the hinges to the adjusted position thereof.

As here shown, the meter socket 12 is constituted by a block 54 of insulation material which is centrally recessed, as at 56 (Fig. 3), and is provided with an aperture 58 which extends from the recess through the block. A washer 60 is disposed in the recess and a bolt 62 extends through the washer and through the opening 58 for threaded engagement in the base 52 of the channel 48. In this manner, the meter socket is firmly secured to the channel 48 but may be readily removed therefrom by merely withdrawing the single bolt 62. The flange portion 46 of the support 44 is apertured, as at 64, to receive the projecting portion of the bolt 62. As best shown in Fig. 2, the aperture is substantially larger than the diameter of the bolt so that there is sufficient clearance for the bolt to be readily withdrawn from the aperture or reinserted therein upon the swinging of the socket block to and from the positions thereof illustrated in Figs. 2 and 3. In order to releasably retain the socket block in the operative position thereof, as illustrated in Figs. 1 and 2, the channel 48 is releasably retained in abutment with the flange 46 by the threaded bolts 66 which secure the base 52 of the channel to the flange 46, as best illustrated in Fig. 4.

The block 54 is provided with the terminal clips 68 which resiliently receive the meter contacts 70, as illustrated in Fig. 5. Referring now to Figs. 1, 2 and 3, it will be noted that the terminal clips 68, adjacent the side wall 18 of the trough, are provided with the terminal elements 72—72, which carry the wire terminals 74 for connection to the relatively lighter and more flexible wires (not illustrated) which connect the meter socket to the electrical equipment or load which is to be supplied with electric current. It will be noted from Fig. 2 that the wire terminals 74 are disposed adjacent the trough opening 28 and due to the relative greater flexibility and smaller diameter of the wires which are connected thereto, usually present no problem to the electrician in making his connections to the load side of the meter socket.

The clips 68 adjacent the side wall 16 are provided with the terminal elements 76 and 78, respectively, said elements being substantially heavier than the previously mentioned terminal elements 72 for connection to the heavier and less flexible cables 80 which connect to the electric service supply. In order to facilitate the connection of the terminals 76 and 78 to the electric supply lines 80A and 80B, provision is made for the previously described pivoted mounting of the socket 12. With the meter 42 and the meter plate 30 removed from the trough, it will be noted that the terminal members 76 and 78 may be positioned outwardly of the trough opening as illustrated in Fig. 3, to facilitate the connection thereof to the electric supply cables 80. It will be readily apparent that in said latter position of the terminal members 76 and 78, the electrician will not be hampered by the adjacent surfaces of the trough and may readily make the necessary connections without being impeded by said adjacent surfaces.

To further facilitate the connection of the cables to the meter sockets, provision is made, pursuant to the present invention, for arranging said cables so that they will be mutually offset both in vertical and horizontal planes. In this connection, it will be noted that the terminal element 78 depends from the meter socket for a greater distance than the terminal member 76, as is best illustrated in Fig. 2. In addition, it will be noted that the laterally extending portion or flange 82 of the terminal element 78 extends outwardly from the meter socket for a greater distance than does the laterally extending portion or flange 84 of the terminal element 76. Moreover, it will be apparent that all of the flanges 82 are aligned in a first row and all of the flanges 84 are aligned in a second row, both rows extending longitudinally of the trough. Therefore, it will be readily apparent that the cable 80B, when connected to the terminal elements 78, will be offset both outwardly and downwardly from the cable 80A which is connected to the terminal elements 76, as best illustrated in Fig. 2. As a result thereof, either cable may be first connected to the various meter sockets without interfering with the connection of the other cable. Similarly, it will be apparent that either cable may be readily disconnected from the meter socket without interfering with the other cable. Moreover, the cables may be more readily identified due to the above described disposition thereof.

Figs. 8 and 9 diagrammatically illustrate applicants' novel wiring arrangement with reference to an electric instrumentality 86 provided with the terminal members 88 and 90, at one side thereof, the terminal member 90 extending outwardly for a greater distance than the terminal member 88. Fig. 8 represents a plan view of said arrangement and Fig. 9 a side view of said arrangement. It will be readily apparent that cables 80A and 80B are mutually offset both horizontally and vertically to facilitate the connection thereof to the respective terminals.

In order to further facilitate the connection of the line cables to the meter socket, provision is made for the solderless connectors 92, illustrated in Fig. 6. Said connector is generally U-shaped, being provided with the spaced legs 94 and 96 which are interconnected by the cross part or bight 98. The legs are provided with the aligned apertures 100, the bottoms of which are substantially rectilinear as indicated at 102. The cross part 98 is provided with an internally threaded collar 104 for receiving the threaded bolt 106.

In making the electrical connections between the wires or cables and the companion terminal elements, the cables, pursuant to the present invention, are first laid or strung over the various terminal elements to which they are to be connected, substantially in the disposition thereof illustrated in Figs. 1 and 2. More specifically, the cables are strung along the various terminal elements, in the manner indicated in Figs. 8 and 9. The cable insulation 108 on each cable is then suitably marked at the portions where it engages the various terminal elements. Each cable may then be removed from the trough and the insulation stripped therefrom at the various marked portions, as indicated at 110 (Fig. 6) to expose the bare wire 112. The meter socket may now be tilted to the position illustrated in Fig. 3. However, it will be understood that, if desired, the meter sockets may first be tilted and the cables strung along the terminal elements, as they project outwardly of the trough. The bolt 106 is then retracted and the connector 92 is positioned on the stripped portion 112 of the cable so that said stripped portion will extend between the confronting surfaces of the connector legs 94—96. The connector is then mounted on the adjacent terminal element, by inserting the laterally extending flange thereof through the apertures 100 so that the stripped portion 112 will be disposed between the bight 98 and the terminal member, said stripped portion and said terminal member being disposed substantially at right angles to each other, as illustrated in Fig. 7. The bolt is then screwed down until the stripped portion 112 is firmly clamped against the terminal element which in turn is firmly clamped against the leg portions 102. The terminal elements are bent downwardly at the free ends thereof, as at 114, to prevent the connector 92 from moving outwardly off the companion terminal element. The assembled connector and terminal is illustrated in Fig. 7 which shows the good electrical and mechanical connection established thereby.

After the cables have been connected to the various terminal elements, the meter sockets 12 are moved from the adjusted position thereof illustrated in Fig. 3 to the operative position thereof illustrated in Fig. 2. It will be noted that in said former position the meter socket engages the support 44 which is disposed in the path of movement thereof, as illustrated in Fig. 3, so that the support serves as a detent to limit the pivotal movement thereof and to retain the terminal elements 76 and 78 in fixed disposition outwardly of the opening 28. After the sockets are returned to the position thereof illustrated in Fig. 2, the channel 48 is then bolted to the support 44 by means of the bolts 66. The meter plates are now placed across the trough opening 28, in position over each of the sockets respectively.

The previously mentioned cross brace 36, carried by the meter plate 30, is in the form of a channel member, as illustrated in Fig. 5, for engaging on a centrally raised and shouldered portion 116 of the block 54. Said shoulder portion is apertured as at 118 for receiving a threaded bolt 120 which extends through the channel 36 and threads into a threaded nut member 122 provided in the aperture 118, whereby the meter plate is firmly retained in position on the trough. As illustrated in Fig. 1, each socket block is provided with a pair of the apertures 118 so that the cross part 36 is secured thereto at two spaced points, as illustrated in said figure.

Figs. 10, 11 and 12 illustrate another embodiment of the present invention for adjustably mounting the meter sockets so that the line terminals thereof may be carried outwardly of the meter trough to facilitate the connection of the electric supply cables thereto.

Pursuant to the present embodiment, the support member 44A is provided with a substantially right angular slot 124 which extends from the upstanding portion 126 of the support into the upper flange 46A thereof, as best illustrated in Figs. 11 and 12. In the present embodiment, the channel 48A is inverted from the position of the channel 48 in the previously described embodiment, and is provided with a threaded bolt 128 which extends through the slot 124 to threadedly engage a nut 130. The sockets 12 are mounted on the channel in substantially the same manner as that previously described. Fig. 11 illustrates the position of the channel 48A in the operative disposition of the sockets 12. It will be readily apparent that by partially retracting the bolt 128, the channel 48A may be swung from the position thereof illustrated in Fig. 11 to the adjusted position thereof illustrated in Fig. 12. It will be understood that in said latter position, the terminal elements 76 and 78 are disposed substantially as in Fig. 3. After the cables have been connected to said terminal elements, as previously described, the channel 48A and the sockets carried thereby may be returned to the operative position thereof and releasably retained therein by tightening the bolts 128. In addition to the provision for adjustably mounting the meter sockets, the present embodiment has the additional advantage that the channel 48A and the sockets carried thereby may be readily bodily removed from the trough by completely withdrawing the bolt 128 from the nut 130. This feature is highly desirable under certain conditions, since both the line terminals and the load terminals of the meter sockets may be conveniently wired outside the trough before the insertion of the channel support into the trough 10. It will also be noted that in the present embodiment the bolts 66 may be omitted since the bolt 128 and nut 130 also secure the channel 48A on the support 44A in the operative position of the sockets.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent, is:

1. An electric meter trough provided with a front opening, meter socket support means within said trough, a meter socket provided on said support means and normally disposed thereby inwardly of said front opening, electric wiring terminals provided on said socket, and means for moving said socket, while mounted on said support, from said normal position thereof to a position in which said terminals have passed through said opening and are disposed outwardly of the trough, whereby to facilitate the wiring of said terminals.

2. An electric meter trough provided with a front opening, meter socket support means within said trough, a meter socket provided on said support means and normally disposed thereby inwardly of said front opening, electric wiring terminals provided on said socket, and means for moving said socket, while mounted on said support, from said normal position thereof to a position in which said terminals have passed through said opening and are disposed outwardly of the trough, whereby to facilitate the wiring of said terminals, said socket moving means comprising a hinged part on said support, said socket being mounted on said hinged part to rotate about the hinge axis to a position angularly related to said normal position thereof.

3. An electric meter trough provided with a front opening, meter socket support means within said trough, a meter socket provided on said support means and normally disposed thereby inwardly of said front opening, electric wiring terminals provided on said socket, and means for moving said socket, while mounted on said support, from said normal position thereof to a position in which said terminals have passed through said opening and are disposed outwardly of the trough, whereby to facilitate the wiring of said terminals, said support having a slotted angular portion positioned relative to said front opening, and said socket moving means comprising a socket carrier provided with a part engaged in said slotted portion and adjustably positioned therein.

4. An electric meter trough having laterally spaced side walls, a rear wall interconnecting said side walls, and a front opening, a support member mounted on said rear wall and extending toward said front opening, an electric meter socket provided with electric wiring terminals at one side thereof, and a carrier for said socket provided on said support member for mounting said socket in normal disposition thereof inwardly of said front opening with said terminals adjacent one of said side walls, said carrier being movably mounted on said support for rotating said socket about its axis to a position wherein said side thereof is disposed outwardly of said opening, whereby to position said wiring terminals clear of said trough to facilitate the wiring thereof.

5. An elongated electric meter trough having laterally spaced side walls, a rear wall interconnecting said side walls, and a front opening, support means mounted longitudinally of said rear wall and extending toward said front opening intermediate said side walls, a longitudinally extending contact carrier provided on said support means between said front opening and said rear wall, and a plurality of electric meter sockets mounted on said carrier in spaced disposition longitudinally thereof, said sockets being normally disposed inwardly of said front opening and each being provided with wire terminals disposed between said side walls, and means mounting said carrier for rotary movement on said support means whereby to concomittantly rotate said sockets to a position wherein said wire terminals thereof are disposed outwardly of said trough.

6. An electric meter trough provided with a front opening, meter socket support means within said trough, a meter socket provided on said support means and normally disposed thereby inwardly of said front opening, electric wiring terminals provided on said socket, and means for moving said socket, while mounted on said support, from said normal position thereof to a position in which said terminals have passed through said opening and are disposed outwardly of the trough, whereby to facilitate the wiring of said terminals, said support having a part disposed in the path of movement of said socket from said normal position thereof to provide a detent for said socket in the moved position thereof.

7. An electric meter trough provided with a front opening, meter socket support means within said trough, a meter socket provided on said support means and normally disposed thereby inwardly of said front opening, electric wiring terminals provided on said socket, and means for moving said socket, while mounted on said support, from said normal position thereof to a position in which said terminals have passed through said opening and are disposed outwardly of the trough, whereby to facilitate the wiring of said terminals, said support having a part disposed inwardly of said opening in a plane parallel to the plane of said opening for positioning said socket in said normal disposition thereof.

References Cited in the file of this patent

UNITED STATES PATENTS

| Number | Name | Date |
|---|---|---|
| Re. 21,148 | Mylius | July 11, 1929 |
| 1,809,025 | Cruser | June 9, 1931 |
| 2,015,112 | Johansson | Sept. 24, 1935 |
| 2,120,574 | Sachs | June 14, 1938 |
| 2,205,202 | Johansson | June 18, 1940 |
| 2,304,923 | Jackson | Dec. 15, 1942 |
| 2,592,299 | Lewis | Apr. 8, 1952 |